Jan. 1, 1929.
P. D. LINDSEY
1,697,280
AUTOMATIC SHUT-OFF VALVE
Filed Oct. 21, 1927
2 Sheets-Sheet 1
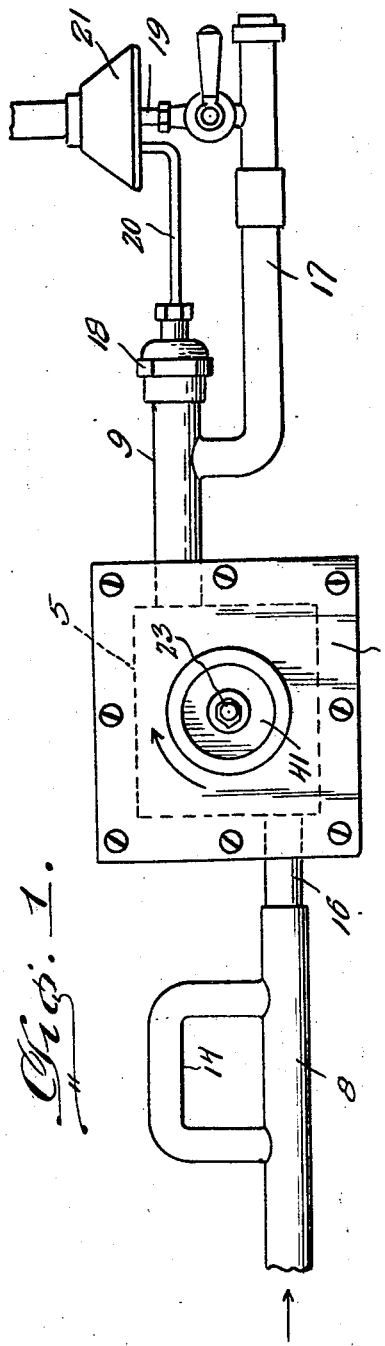
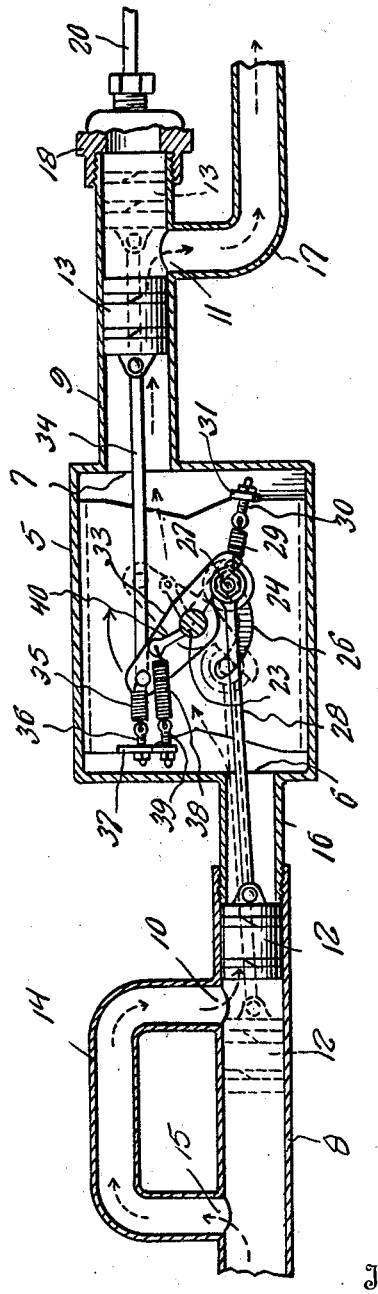
Inventor
P. D. Lindsey,
By J. Stanley Burch
Attorney Jan. 1, 1929.
P. D. LINDSEY
1,697,280
AUTOMATIC SHUT-OFF VALVE
Filed Oct. 21, 1927
2 Sheets-Sheet 2
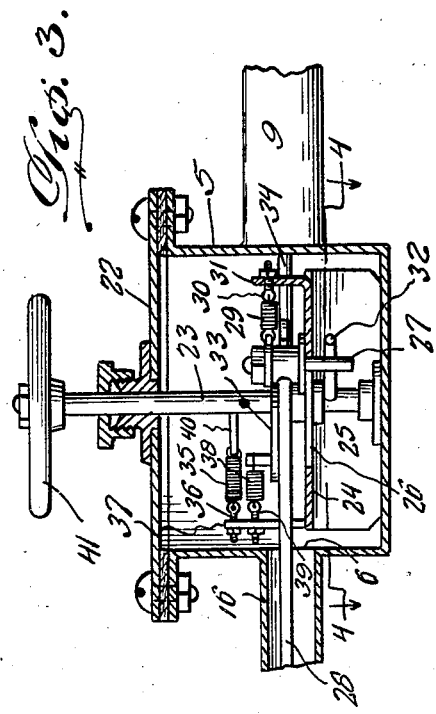
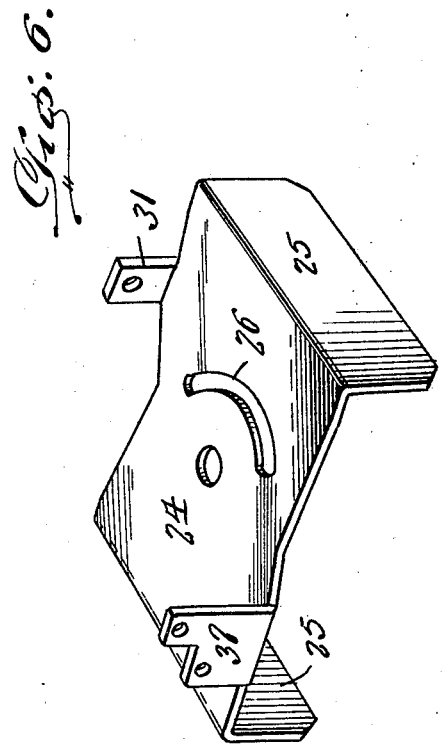
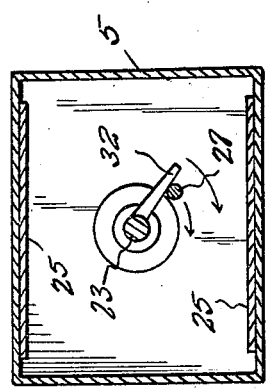
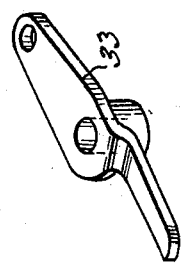
Inventor
P. D. Lindsey,
By J. Stanley Burch
Attorney Patented Jan. 1, 1929.

1,697,280

UNITED STATES PATENT OFFICE.

PARREN D. LINDSEY, OF HOMINY, OKLAHOMA.

AUTOMATIC SHUT-OFF VALVE.

Application filed October 21, 1927. Serial No. 227,713.

This invention relates to improvements in shut-off valves which are designed to shut off the flow therethrough of gas or liquid under pressure.

The primary object of the present invention is to provide an improved valve which will automatically shut off the flow of gas or liquid therethrough when the pressure of the latter is unduly lowered from any cause, and which will thereafter continue to act as a positive shut-off for said flow until said valve is manually opened.

A further object is to provide an automatic shut-off valve that shall be positive in action, simple in construction, not liable to readily get out of working order, and cheap to manufacture.

The invention consists in the novel form, combination and arrangement of parts hereinafter more fully described, shown in the accompanying drawings and claimed.

In the drawings:

Figure 1 is a top plan view of a gas shut-off valve embodying the present invention.

Figure 2 is an enlarged fragmentary view thereof in central longitudinal section.

Figure 3 is a fragmentary detail view of the device as shown in Figure 2, partly in section and partly in elevation.

Figure 4 is a section on line 4—4 of Figure 3.

Figure 5 is an enlarged perspective view of the lever operated by the outlet piston valve for holding the inlet piston valve open; and Figure 6 is an enlarged perspective view of the spring-mounting and lever-supporting guide plate.

Referring more in detail to the drawings, 5 indicates a casing having laterally offset inlet and outlet ports 6 and 7 in opposite sides thereof, respectively connected to supply and outlet pipes 8 and 9 having lateral or side supply and outlet ports 10 and 11 and in which are respectively reciprocable inlet and outlet piston valves 12 and 13. The supply pipe 8 is provided with a by-pass 14 opening through port 10 and through a port 15 therebehind, the inlet piston valve 12 being positionable between the ports 10 and 15 as shown by dotted lines in Figure 2 to permit the gas or liquid under pressure to flow into casing 5 and outlet pipe 9 by way of the by-pass 14, and positionable ahead of supply port 10 as shown by full lines in said figure to shut off the flow to said casing.

As shown, the casing 5 has an inlet nipple 16 onto which the supply pipe 8 is threaded, and which is engaged by the piston 12 whereby the closing movement of the latter is properly limited.

In a like manner, the outlet piston valve 13 is movable ahead of port 11, as shown by dotted lines, to permit the gas or liquid to flow from pipe 9 through port 11 to be conducted by pipe 17 to a desired point of discharge, consumption or use, a cap 18 being applied to the outer end of pipe 9 to properly limit the opening movement of piston 13, and the piston 13 being further movable behind port 11 or backwardly for a purpose which will later become apparent.

The cap 18 has a vent to prevent back pressure from building up ahead of piston 13 and preventing opening of the latter in case any small amount of the gas or liquid should leak past said piston. Where the pipe 17 supplies gas to the fuel feed pipe 19 of a gas burner, the vent of cap 18 may embody a vent pipe 20 extending to and entering the gas and air mixer 21 of the burner so that the leaking gas will be consumed by the burner.

Journaled in, and extending through the removable cover plate 22 of casing 5 is a spindle 23 that also extends through the raised flat intermediate plate portion 24 of a support having downturned ends 25 resting on the bottom of casing 5. The plate 24 has an arcuate slot 26, concentric with and at one side of spindle 23, in which is freely movable a pin 27 depending from an end of a pitman 28 whose other end is pivoted to piston valve 12. The piston valve 12 is normally moved to closed position by means of a tension spring 29 having means 30 for adjusting the tension thereof and connecting pitman 28 to a mounting lug 31 of plate 24.

Rigid with and projecting laterally from spindle 23 below plate 24, is a pin 32 in whose path the pin 27 is disposed, whereby, when the spindle 23 is turned in the direction of the arrow in Figure 1, the piston 12 is moved from the normal closed full line position of Figure 2 to the dotted line open position thereof.

Loosely journaled on spindle 23 and resting on plate 24 is a lever 33, having a long arm pivoted to one end of a pitman 34 whose other end is pivoted to piston 13, and having a shorter arm in whose path the pin 27 and adjacent end of pitman 28 are disposed. The piston or piston valve 13 is normally moved to the full line closed position, behind port 11, of Figure 2 by a tension spring 35 having means 36 for adjusting the tension thereof and connecting a mounting lug 37 of plate 24 with pitman 34.

The spindle 23 is turned, to move pin 32 and permit closing of piston valve 12, by means of a tension spring 38 which has tension-adjusting means 39 and connects lug 37 with a lateral arm 40 rigid with spindle 23 above plate 24.

In operation, the handle 41 of spindle 23 is turned so as to cause pin 32 to open piston valve 12 and allow the gas or liquid to flow through port 10 into casing 5 and pipe 9 and force piston 13 to open position with the pressure acting on said piston to hold it open and to hold the shorter arm of lever 33 against pitman 28 to hold piston valve 12 open. The handle or hand wheel 41 is then released, and spring 38 returns spindle 23 and pin 32 to normal position. Should the pressure of the gas or liquid be discontinued or unduly lowered from any cause, spring 35 will close piston valve 13 and move lever 33 to released position so that spring 29 will close piston valve 12. If the pressure should thereafter be continued again or raised to normal, the same will act on piston valve 12 only to better hold it closed, and it is, therefore, evident that the flow of the liquid or gas will be effectively cut-off until the valve is again manually opened.

Minor changes may be made without departing from the spirit and scope of the invention as claimed.

What I claim as new is:

1. An automatic gas or liquid shut-off valve comprising a casing having opposite supply and outlet pipes respectively having lateral supply and outlet ports, inlet and outlet piston valves movable toward each other within said pipes to close said ports and away from each other to open said ports, yieldable means to move each of said piston valves normally to port-closing position, manually operable means to move said inlet piston valve to open said supply port, yieldable means to return said manually operable means to normal position for permitting the inlet piston valve to close, and means operatively connecting the outlet piston valve to said inlet piston valve for holding the latter open so long as the outlet piston valve is held open by the pressure of the gas or liquid flowing through the shut-off valve.

2. An automatic gas or liquid shut-off valve comprising a casing having opposite supply and outlet pipes respectively having lateral supply and outlet ports, inlet and outlet piston valves movable toward each other within said pipes to close said ports and away from each other to open said ports, yieldable means to move each of said piston valves normally to port-closing position, manually operable means to move said inlet piston valve to open said supply port, yieldable means to return said manually operable means to normal position for permitting the inlet piston valve to close, and means operatively connecting the outlet piston valve to said inlet piston valve for holding the latter open so long as the outlet piston valve is held open by the pressure of the gas or liquid flowing through the shut-off valve, said connecting means including pitmen connected to the piston valves and extending into the casing, and a lever pivoted in the casing having an arm pivoted to the pitman of the outlet piston valve and another arm in whose path the pitman of the inlet piston valve is disposed.

3. An automatic gas or liquid shut-off valve comprising a casing having opposite supply and outlet pipes respectively having lateral supply and outlet ports, inlet and outlet piston valves movable toward each other within said pipes to close said ports and away from each other to open said ports, yieldable means to move each of said piston valves normally to port-closing position, manually operable means to move said inlet piston valve to open said supply port, yieldable means to return said manually operable means to normal position for permitting the inlet piston valve to close, and means operatively connecting the outlet piston valve to said inlet piston valve for holding the latter open so long as the outlet piston valve is held open by the pressure of the gas or liquid flowing through the shut-off valve, said connecting means including pitmen connected to the piston valves and extending into the casing, and a lever pivoted in the casing having an arm pivoted to the pitman of the outlet piston valve and another arm in whose path the pitman of the inlet piston valve is disposed, said manually operable means embodying a pin depending from the pitman of the inlet piston valve, and a spindle journaled in the casing and having a rigid lateral pin in whose path said depending pin is disposed.

4. An automatic gas or liquid shut-off valve comprising a casing having opposite supply and outlet pipes respectively having lateral supply and outlet ports, inlet and outlet piston valves movable toward each other within said pipes to close said ports and away from each other to open said ports, yieldable means to move each of said piston valves normally to port-closing position, manually operable means to move said inlet piston valve to open said supply port, yieldable means to return said manually operable means to normal position for permitting the inlet piston valve to close, means operatively connecting the outlet piston valve to said inlet piston valve for holding the latter open so long as the outlet piston valve is held open by the pressure of the gas or liquid flowing through the shut-off valve, said connecting means including pitmen connected to the piston valves and extending into the casing, and a lever pivoted in the casing having an arm pivoted to the pitman of the outlet piston valve and another arm in whose path the pitman of the inlet piston valve is disposed, said manually operable means embodying a pin depending from the pitman of the inlet piston valve and a spindle journaled in the casing and having a rigid lateral pin in whose path said depending pin is disposed, said lever being loosely mounted on said spindle, and a supporting plate mounted in the casing above said lateral pin and on which said lever rests, said supporting plate having an arcuate slot concentric with said spindle through which said depending pin projects, said pitmen being pivoted to said piston valves.

5. An automatic gas or liquid shut-off valve comprising a casing having opposite supply and outlet pipes respectively having lateral supply and outlet ports, inlet and outlet piston valves movable toward each other within said pipes to close said ports and away from each other to open said ports, yieldable means to move each of said piston valves normally to port-closing position, manually operable means to move said inlet piston valve to open said supply port, yieldable means to return said manually operable means to normal position for permitting the inlet piston valve to close, means operatively connecting the outlet piston valve to said inlet piston valve for holding the latter open so long as the outlet piston valve is held open by the pressure of the gas or liquid flowing through the shut-off valve, said connecting means including pitmen connected to the piston valves and extending into the casing, and a lever pivoted in the casing having an arm pivoted to the pitman of the outlet piston valve and another arm in whose path the pitman of the inlet piston valve is disposed, said manually operable means embodying a pin depending from the pitman of the inlet piston valve, a spindle journaled in the casing and having a rigid lateral pin in whose path said depending pin is disposed, said lever being loosely mounted on said spindle, and a supporting plate mounted in the casing above said lateral pin and on which said lever rests, said supporting plate having an arcuate slot concentric with said spindle through which said depending pin projects, said pitmen being pivoted to said piston valves, each of said yieldable means embodying tension springs anchored to the supporting plate and having tension adjusting means.

6. An automatic gas or liquid shut-off valve comprising a casing having opposite supply and outlet pipes respectively having lateral supply and outlet ports, inlet and outlet piston valves movable toward each other within said pipes to close said ports and away from each other to open said ports, yieldable means to move each of said piston valves normally to port-closing position, manually operable means to move said inlet piston valve to open said supply port, yieldable means to return said manually operable means to normal position for permitting the inlet piston valve to close, means operatively connecting the outlet piston valve to said inlet piston valve for holding the latter open so long as the outlet piston valve is held open by the pressure of the gas or liquid flowing through the shut-off valve, said supply pipe having a by-pass and said inlet piston valve being movable to a position between the ends of the by-pass when opened.

7. An automatic gas or liquid shut-off valve comprising a casing having opposite supply and outlet pipes respectively having lateral supply and outlet ports, inlet and outlet piston valves movable toward each other within said pipes to close said ports and away from each other to open said ports, yieldable means to move each of said piston valves normally to port closing position, manually operable means to move said inlet piston valve to open said supply port, yieldable means to return said manually operable means to normal position for permitting the inlet piston valve to close, means operatively connecting the outlet piston valve to said inlet piston valve for holding the latter open so long as the outlet piston valve is held open by the pressure of the gas or liquid flowing through the shut-off valve, and means to limit the opening movement of the outlet piston valve embodying a cap on the outer end of the outlet pipe having a vent.

8. An automatic gas or liquid shut-off valve comprising a casing having opposite supply and outlet pipes respectively having lateral supply and outlet ports, inlet and outlet piston valves movable toward each other within said pipes to close said ports and away from each other to open said ports, yieldable means to move each of said piston valves normally to port-closing position, manually operable means to move said inlet piston valve to open said supply port, yieldable means to return said manually operable means to normal position for permitting the inlet piston valve to close, means operatively connecting the outlet piston valve to said inlet piston valve for holding the latter open so long as the outlet piston valve is held open by the pressure of the gas or liquid flowing through the shut-off valve, means to limit the opening movement of the outlet piston valve embodying a cap on the outer end of the outlet pipe having a vent, and a pipe to conduct the gas to a burner from the outlet port, said vent embodying a pipe to conduct any gas leaking past the outlet piston valve to said burner.

In testimony whereof I affix my signature.

PARREN D. LINDSEY.